United States Patent
Kamiya

(10) Patent No.: US 7,748,250 B2
(45) Date of Patent: Jul. 6, 2010

(54) THREE-AXIAL ACCELERATION SENSOR INSPECTION DEVICE AND METHOD OF INSPECTING THREE-AXIAL ACCELERATION SENSOR

(75) Inventor: Isao Kamiya, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 315 days.

(21) Appl. No.: 11/806,428

(22) Filed: May 31, 2007

(65) Prior Publication Data

US 2007/0277586 A1    Dec. 6, 2007

(30) Foreign Application Priority Data

Jun. 2, 2006 (JP) .............................. 2006-155074

(51) Int. Cl.
  *G01P 21/00* (2006.01)
(52) U.S. Cl. ....................................... 73/1.38; 73/865.3
(58) Field of Classification Search ................. 73/1.38, 73/65.01, 493, 494, 865.9, 865.3
  See application file for complete search history.

(56) References Cited

U.S. PATENT DOCUMENTS 2,788,654 A * 4/1957 Wiancko et al. .............. 73/1.38
3,350,916 A * 11/1967 Bock ........................... 73/1.38
5,353,642 A * 10/1994 Hasegawa et al. ............. 73/535
5,895,858 A * 4/1999 Malone et al. ................ 73/1.38
6,196,048 B1 * 3/2001 Kunimi ........................ 73/1.38
6,640,610 B2 * 11/2003 Lueth et al. ................... 73/1.38
6,758,080 B1 * 7/2004 Ragan et al. .................. 73/1.38

FOREIGN PATENT DOCUMENTS

JP     10-2914    1/1998
JP     2822662    11/1998

* cited by examiner

*Primary Examiner*—Thomas P Noland
(74) *Attorney, Agent, or Firm*—Kubotera & Associates LLC

(57) ABSTRACT

A three-axial acceleration sensor inspection device is provided for inspecting a three-axial acceleration sensor that detects acceleration components in three axes crossing perpendicularly with each other and outputs acceleration component signals. The three-axial acceleration sensor inspection device includes a test plate for mounting the three-axial acceleration sensor thereon; a supporting plate for supporting and rotating the test plate; a main rotational shaft for rotating the supporting plate. The supporting plate is arranged radially around the main rotational shaft along a radius direction of the main rotational shaft, and is disposed at each of at least four locations with an equal angular interval along a circumferential direction of the main rotational shaft.

3 Claims, 6 Drawing Sheets

THREE-AXIAL ACCELERATION SENSOR INSPECTION DEVICE AND METHOD OF INSPECTING THREE-AXIAL ACCELERATION SENSOR

BACKGROUND OF THE INVENTION AND RELATED ART STATEMENT

The present invention relates to a three-axial acceleration sensor inspection device for inspecting a three-axial acceleration sensor that detects acceleration components in three axes crossing perpendicularly with each other to output an acceleration component signal. Further, the present invention relates to a method of inspecting a three-axial acceleration sensor.

In a conventional three-axial acceleration sensor inspection device, a main rotational shaft is provided for rotating a support plate having an L character shape. A test plate drive motor is attached to the support plate for rotating a test plate arranged in parallel to a shaft axis of the main rotational shaft. A plurality of three-axial acceleration sensors is mounted on the test plate.

When the three-axial acceleration sensors are inspected, the main rotational shaft rotates the test plate by 180 degrees to measure an acceleration component in a Z direction from gravity applied to the three-axial acceleration sensors during the rotation. Then, the main rotational shaft turns by 90 degrees so that the test plate stands horizontally. Then, the test plate drive motor rotates the test plate by 360 degrees to measure acceleration components in an X direction and a Y direction from gravity applied to the three-axial acceleration sensors during the rotation. Accordingly, it is determined whether the three-axial acceleration sensors pass or fail, or acceleration component signals in each axis are calibrated (refer to Patent Reference).

Patent Reference: Japanese Patent Publication No. 10-2941

As described above, in the conventional three-axial acceleration sensor inspection device, a plurality of three-axial acceleration sensors is mounted on the test plate. In inspecting the three-axial acceleration sensors, the main rotational shaft and the test plate drive motor rotate the test plate. After one series of three-axial acceleration sensors is inspected, the three-axial acceleration sensors are removed from the test plate. Then, a next series of three-axial acceleration sensors is mounted on the test plate for the inspection.

Accordingly, in the conventional three-axial acceleration sensor inspection device, it is necessary to mount and demount the three-axial acceleration sensors on and from the test plate every series of inspection. That is, a total inspection time or a takt time becomes a sum of a mounting time of the three-axial acceleration sensors; a demounting time; a measurement time per each axis; and an angular position changing time from one angle position to another angle position. In short, it takes a long period of time to inspect a large number of three-axial acceleration sensors, thereby deteriorating inspection efficiency.

In order to modify the conventional three-axial acceleration sensor inspection device to be capable of inspecting a large number of three-axial acceleration sensors, it is necessary to increase a size of the conventional three-axial acceleration sensor inspection device. Further, the conventional three-axial acceleration sensor inspection device is usually installed in an environmental chamber at a constant temperature and a constant humidity. Accordingly, when the conventional three-axial acceleration sensor inspection device has a larger size, it is necessary to increase a size of the environmental chamber as well, thereby increasing running energy thereof.

In view of the problems described above, an object of the present invention is to provide a three-axial acceleration sensor inspection device having a small size with improved efficiency.

Further objects and advantages of the invention will be apparent from the following description of the invention.

SUMMARY OF THE INVENTION

In order to attain the objects described above, according to the present invention, a three-axial acceleration sensor inspection device is provided for inspecting a three-axial acceleration sensor that detects acceleration components in three axes crossing perpendicularly with each other and outputs acceleration component signals.

The three-axial acceleration sensor inspection device includes a test plate for mounting the three-axial acceleration sensor thereon; a supporting plate for supporting and rotating the test plate; and a main rotational shaft for rotating the supporting plate. The supporting plate is arranged radially around the main rotational shaft along a radius direction of the main rotational shaft, and is disposed at each of at least four locations with an equal angular interval along a circumferential direction of the main rotational shaft.

In the present invention, with the configuration described above, it is possible to inspect the three-axial acceleration sensors at the four locations in each axial position at the same time. Accordingly, a total inspection time or a takt time becomes a sum of a mounting time of the three-axial acceleration sensors; a measurement time in one axis; a demounting time; and an angular position changing time from one angle position to another angle position.

As a result, it takes a short period of time to inspect a large number of three-axial acceleration sensors, thereby improving inspection efficiency. Further, the test plate rotates around the main rotational shaft in a reduced rotational radius, thereby reducing a size of the three-axial acceleration sensor inspection device.

DETAILED DESCRIPTION OF PREFERRED EMBODIMENTS

Hereunder, embodiments of the present invention will be explained with reference to the accompanying drawings.

Figure 1:
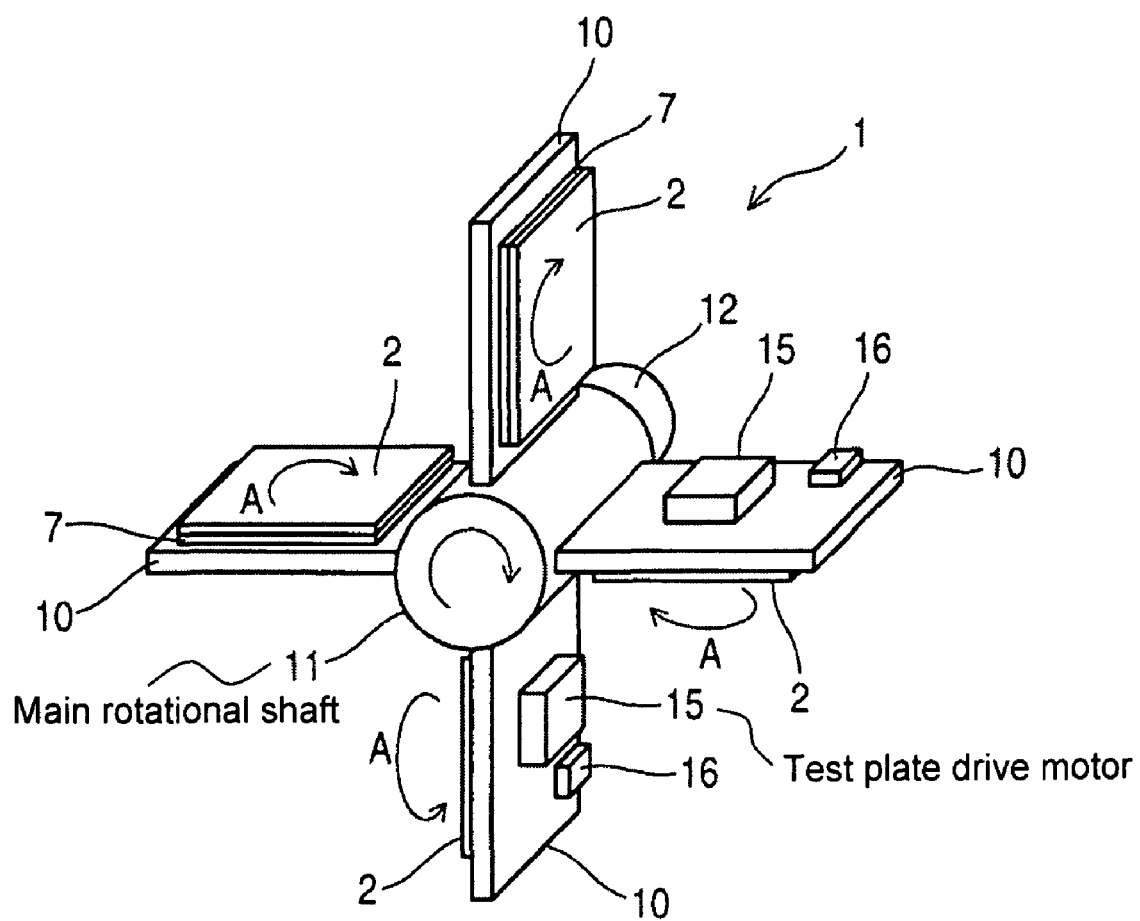
FIG. 1 is a schematic perspective view showing a three-axial acceleration sensor inspection device according to an embodiment of the present invention.
Figure 2:
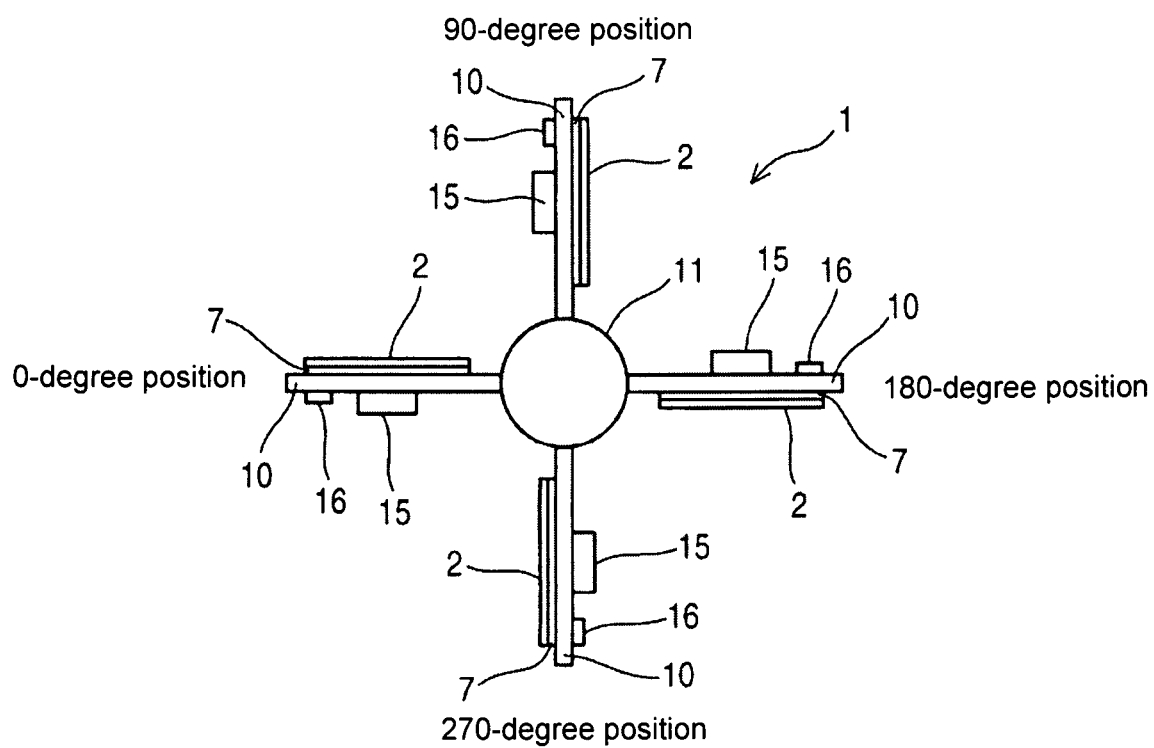
FIG. 2 is a schematic front view showing the three-axial acceleration sensor inspection device according to the embodiment of the present invention.
Figure 3:
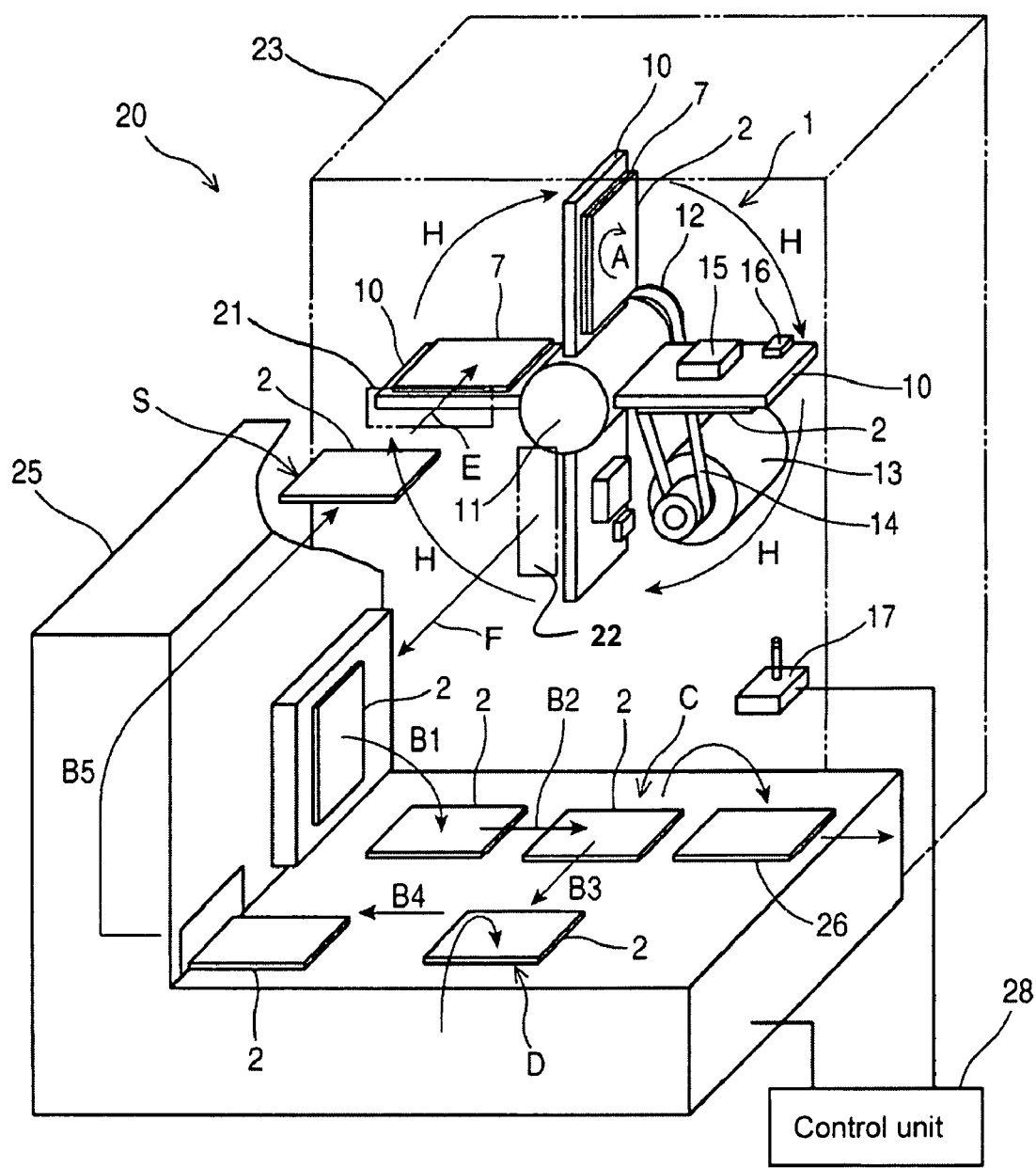
FIG. 3 is a schematic perspective view showing a three-axial acceleration sensor inspection system according to the embodiment of the present invention.
Figure 4:
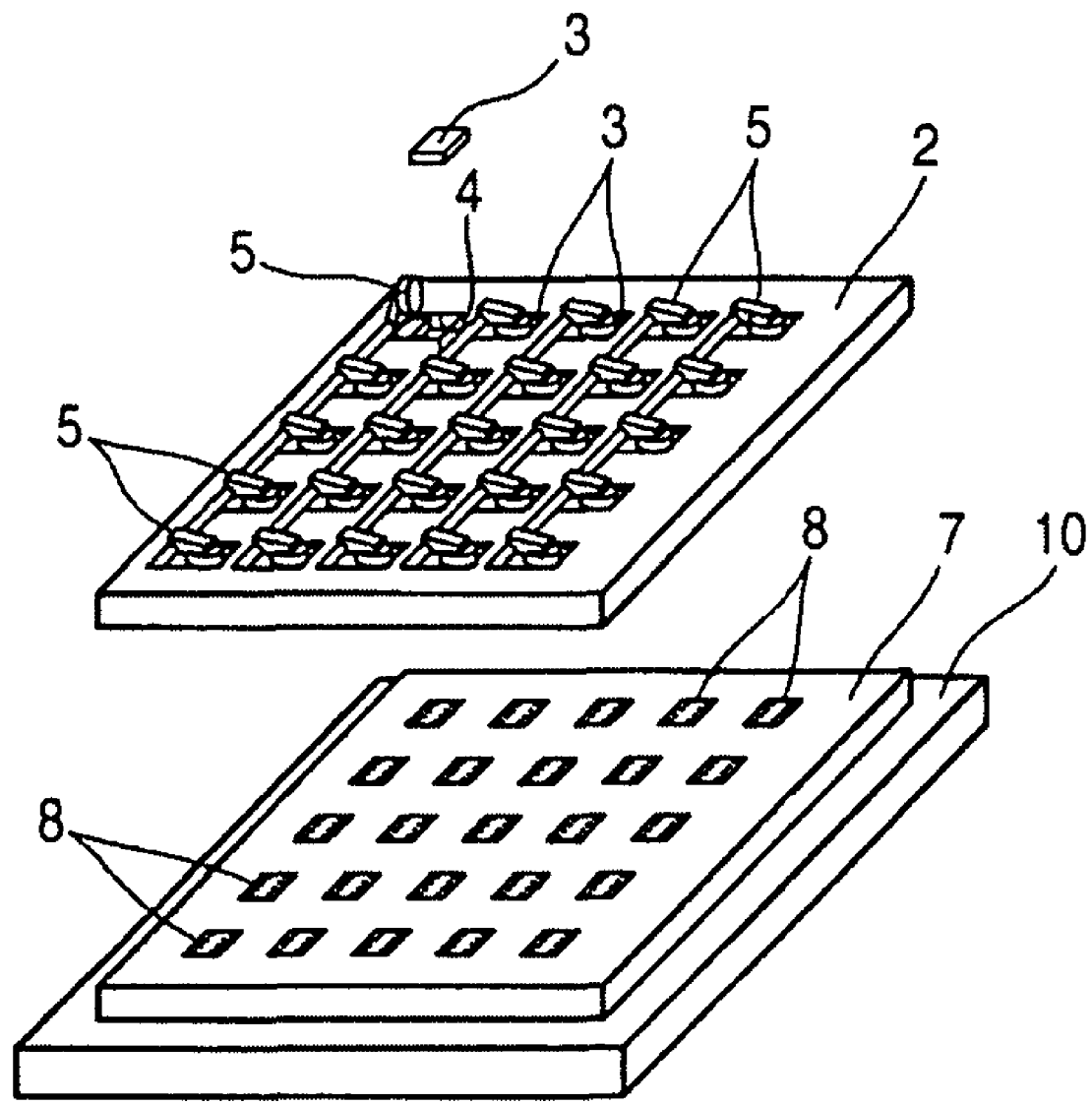
FIG. 4 is a schematic view showing a test plate and a test tray according to the embodiment of the present invention.

FIG. 1 is a schematic perspective view showing a three-axial acceleration sensor inspection device 1 according to an embodiment of the present invention. FIG. 2 is a schematic front view showing the three-axial acceleration sensor inspection device 1 according to the embodiment of the present invention. FIG. 3 is a schematic perspective view showing a three-axial acceleration sensor inspection system 20 according to the embodiment of the present invention. FIG. 4 is a schematic view showing a test plate 7 and a test tray 2 according to the embodiment of the present invention.

As shown in FIG. 4, the test tray 2 is a container for collectively retaining one series of three-axial acceleration sensors 3 all together, and is provided with a plurality of receptacle portions 4 each for retaining the three-axial acceleration sensor 3 and fixing members 5 for holding the three-axial acceleration sensors 3 retained in the receptacle portions 4.

In the embodiment, each of the three-axial acceleration sensors 3 includes a weight portion; a flexible portion with a cross shape connected to the weight portion; and a piezo resistor element disposed on the flexible portion. The piezo resistor element constitutes a bridge circuit for converting displacement of the flexible portion into an electrical signal and outputting acceleration components in the three axes, i.e., an X axis, a Y axis, and a Z axis crossing perpendicularly each other, as acceleration component signals.

As shown in FIG. 4, the test plate 7 is provided with sockets 8 disposed at positions corresponding to those of the three-axial acceleration sensors 3 retained in the test tray 2, so that the sockets 8 engage output terminals, power source terminals, and the likes of the three-axial acceleration sensors 3. The test plate 7 has a function of collectively measuring an output from each of one series of the three-axial acceleration sensors 3. Further, the test plate 7 is mounted on a supporting plate 10.

As shown in FIG. 1, four supporting plates 10 are arranged radially around a main rotational shaft 11 along a radial direction of the main rotational shaft 11 at four locations with an equal angular interval of 90 degrees along a circumferential direction of the main rotational shaft 11.

As shown in FIG. 3, the main rotational shaft 11 is provided with a pulley 12 at one shaft end portion thereof. A belt 14 is placed between the pulley 12 and a rotational shaft of a main rotational shaft drive motor 13 such as a stepping motor, so that the main rotational shaft drive motor 13 drives the pulley 12. A test plate drive motor 15 is disposed on a backside surface of the supporting plate 10. A rotational shaft of the test plate drive motor 15 is connected to the test plate 7 arranged at a front surface of the supporting plate 10 for rotating the test plate 7.

In the embodiment, a wireless transmitter 16 is mounted on the supporting plate 10 for converting the acceleration component signals of the three-axial acceleration sensors 3 sent from the test plate 7 to wireless signals, and for transmitting the wireless signals to a wireless receiver 17 shown in FIG. 3.

In the three-axial acceleration sensor inspection device 1, the main rotational shaft drive motor 13 rotates and stops the main rotational shaft 11 such that each of the supporting plates 10 is situated at a specific angular position as shown in FIG. 2. As described above, four of the supporting plates 10 are arranged radially around the main rotational shaft 11. As shown in FIG. 2, it is arranged such that each of the supporting plates 10 stops at a horizontal left angular position (referred to as 0-degree position); at a vertical upper angular position (referred to as 90-degree position); at a horizontal right angular position (referred to as 180-degree position); and at a vertical lower angular position (referred to as 270-degree position).

In the embodiment, at each of the angular positions, the test plate drive motor 15 rotates the test plate 7 rotatably supported on the supporting plate 10 together with the test tray 2 attached to the test plate 7 in parallel to the front surface of the supporting plate 10.

In the three-axial acceleration sensor inspection system 20 shown in FIG. 3, an environmental chamber 23 (indicated by phantom lines) is provided for retaining the three-axial acceleration sensor inspection device 1, and includes a supply shutter 21 (indicated by phantom lines) and a take-out shutter 22 (indicated by phantom lines).

Further, a sensor supply device 25 is provided in the three-axial acceleration sensor inspection system 20. In the embodiment, the sensor supply device 25 has a function of mounting the test tray 2 retaining the three-axial acceleration sensors 3 on the test plate 7 on the supporting plate 10 at the 0-degree position before inspection. Further, the sensor supply device 25 has a function of demounting the test tray 2 retaining the three-axial acceleration sensors 3 from the test plate 7 on the supporting plate 10 at the 270-degree position after the inspection.

The sensor supply device 25 also has a function of transporting the test tray 2 along a transport path indicated by arrows B1 to B5 shown in FIG. 3. Further, the sensor supply device 25 has a function of moving the three-axial acceleration sensors 3 from the test tray 2 to a transport tray 26 at a station C after the inspection, and placing the three-axial acceleration sensors 3 on the test tray 2 in an empty state at a station D.

In the embodiment, the three-axial acceleration sensor inspection system 20 is further provided with a control unit 28 such as a personal computer and the likes. The control unit 28 has a function of obtaining the acceleration component signals of the three-axial acceleration sensors 3 sent from the wireless transmitters 16 mounted on the supporting plates 10 with the wireless receiver 17.

Further, the control unit 28 has a function of controlling each component of the three-axial acceleration sensor inspection system 20 including the three-axial acceleration sensor inspection device 1 and performing an inspection process for inspecting characteristics of the three-axial acceleration sensors 3. The control unit 28 is provided with a storage unit (not shown) for storing a program for performing the inspection process; various data for the program; and a process result of the inspection process.

Figure 5:
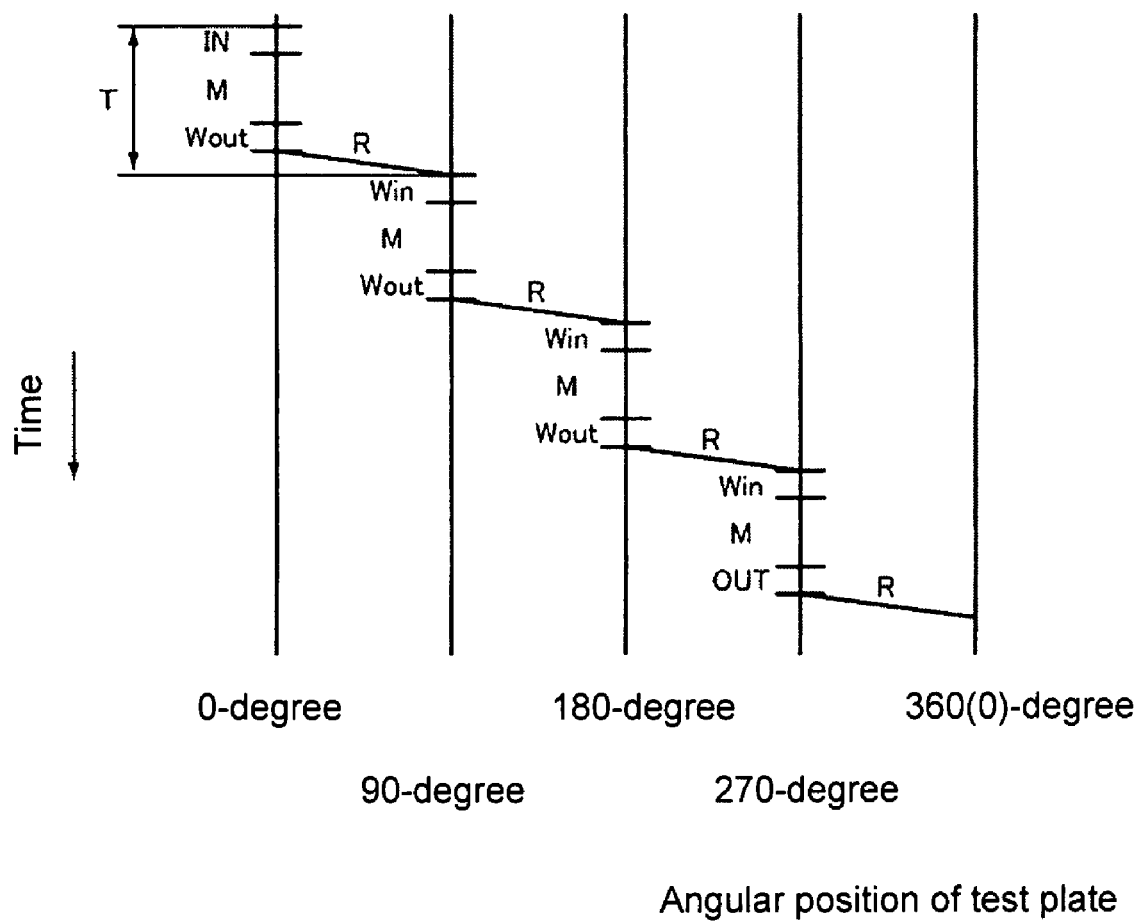
FIG. 5 is a time chart of the three-axial acceleration sensor inspection device according to the embodiment of the present invention.

A time chart shown in FIG. 5 will be explained next. In FIG. 5, a symbol "IN" represents a mounting time when the test tray 2 is mounted on the test plate 7 situated at the 0-degree position as an initial or first position. A symbol "OUT" represents a demounting time when the test tray 2 is demounted from the test plate 7 situated at the 270-degree position as a last or final position.

Further, in FIG. 5, a symbol "M" represents a measurement time at each of the angular positions. A symbol "R" represents an angular position changing time for changing the angular position from one to another with the main rotational shaft 11. A symbol "Win" represents a waiting time with respect to the mounting time at each of the angular positions. A symbol "Wout" represents a waiting time with respect to the demounting time at each of the angular positions. A symbol "T" represents an inspection time or a takt time during the inspection process.

In the embodiment, the control unit 28 concurrently performs the inspection process or measurement process of the three-axial acceleration sensors 3 and a preparation process thereof in parallel. In the measurement process, the control unit 28 opens the supply shutter 21 of the environmental chamber 23. A first robot arm (not shown) transports the test tray 2 placed at a supply position S of the sensor supply device 25 (FIG. 3) and retaining one series of the three-axial acceleration sensors 3 along an arrow direction E (FIG. 3).

Then, the test tray 2 is attached to or mounted on the test plate 7 of the three-axial acceleration sensor inspection device 1 staying at the 0-degree position. Afterward, the first robot arm is pulled out in a direction opposite to the arrow direction E, and the supply shutter 21 is closed (corresponding to the mounting time "IN" in FIG. 5).

At this time, the three-axial acceleration sensors 3 retained in the test trays 2 on the test plates 7 situated at the other angular positions are in an idle state (corresponding to the waiting time "Win" in FIG. 5). After confirming that the test tray 2 is attached to the test plate 7, the control unit 28 obtains the acceleration component signals of the three-axial acceleration sensors 3 due to gravity at each angular position through the wireless transmitters 16 and the wireless receiver 17.

Then, the test plate drive motor 15 rotates the test plate 7 situated at each angular position by 90 degrees in an arrow direction A. After the test plates 7 are stopped, the control unit 28 obtains the acceleration component signals of the three-axial acceleration sensors 3 one more time. Then, the test plate drive motors 15 rotate the test plates 7 by 90 degrees in a direction opposite to the arrow direction A, so that the test plates 7 return to the original position (corresponding to the measurement time "M" in FIG. 5).

At this time, the three-axial acceleration sensors 3 situated at the 0-degree position output the acceleration component signals in a case that the gravity acceleration of 1 G is applied in the Z axis direction, while the X axis and the Y axis are horizontal at the original position and after rotating in the arrow direction A. Further, the three-axial acceleration sensors 3 situated at the 90-degree position output the acceleration component signals in a case that the gravity acceleration of 1 G is applied in the X axis direction, while the Z axis and the Y axis are horizontal at the original position. At the same time, the three-axial acceleration sensors 3 situated at the 90-degree position output the acceleration component signals in a case that the gravity acceleration of 1 G is applied in the Y axis direction, while the X axis and the Z axis are horizontal after rotating in the arrow direction A.

Similarly, the three-axial acceleration sensors 3 situated at the 180-degree position output the acceleration component signals in a case that the gravity acceleration of −1 G is applied in the Z axis direction, while the X axis and the Y axis are horizontal at the original position and after rotating in the arrow direction A. The gravity acceleration of −1 G is applied to the three-axial acceleration sensors 3 in an inverted state relative to the three-axial acceleration sensors 3 situated at the 0-degree position.

Further, the three-axial acceleration sensors 3 situated at the 270-degree position output the acceleration component signals in a case that the gravity acceleration of −1 G is applied in the X axis direction, while the Z axis and the Y axis are horizontal at the original position. At the same time, the three-axial acceleration sensors 3 situated at the 90-degree position output the acceleration component signals in a case that the gravity acceleration of −1 G is applied in the Y axis direction, while the X axis and the Z axis are horizontal after rotating in the arrow direction A. The gravity acceleration of −1 G is applied to the three-axial acceleration sensors 3 in an inverted state relative to the three-axial acceleration sensors 3 situated at the 90-degree position.

After the measurement at each of the angular positions described above is completed, the control unit 28 opens the take-out shutter 22 of the environmental chamber 23, so that a second robot arm (not shown) of the sensor supply device 25 enters the environmental chamber 23 in a direction opposite to an arrow direction F in FIG. 3. Then, the test tray 2 retaining the three-axial acceleration sensors 3 thus inspected is demounted from the test plate 7 situated at the 270-degree position in the three-axial acceleration sensor inspection device 1, and the second robot arm is pulled out in the arrow direction F to transport the test tray 2 with one series of the three-axial acceleration sensors 3 to the sensor supply device 25. Lastly, the take-out shutter 22 is closed (corresponding to the demounting time "OUT" in FIG. 5).

At this time, the three-axial acceleration sensors 3 retained in the test trays 2 on the test plates 7 situated at the other angular positions are in an idle state (corresponding to the waiting time "Wout" in FIG. 5). After the three-axial acceleration sensors 3 thus inspected are taken out, the control unit 28 controls the main rotational shaft 11 to rotate by 90 degrees in an arrow direction H in FIG. 3 (corresponding to the angular position changing time "R" in FIG. 5). Afterward, the measurement process described above is repeated from the start.

At this time, no test tray is mounted on the test plate 7 situated at the 0-degree position. Accordingly, the takt time T constitutes a sum of the mounting time IN (=the waiting time Win); the measurement time M per one measurement position; the demounting time OUT (=the waiting time Wout); and the angular position changing time R. After the inspection is completed, one series of the three-axial acceleration sensors 3 thus inspected is taken out to the sensor supply device 25 per every takt time T.

Along with the measurement process described above, the control unit 28 performs the preparation process within the takt time T as follows.

In the first step, after one series of the three-axial acceleration sensors 3 thus inspected is taken out to the sensor supply device 25, the control unit 28 controls the sensor supply device 25 to turn the test tray 2 along a transport path B shown in FIG. 3. In the second step, the control unit 28 controls the sensor supply device 25 to transport the test tray 2 to a station C along a transport path B2. A third robot arm (not shown) moves the three-axial acceleration sensors 3 thus inspected to a transport tray 26, so that the transport tray 26 with the three-axial acceleration sensors 3 thus inspected is transported to a next process. At the same time, an empty transport tray 26 is arranged at a specific location.

In the third step, the control unit 28 controls the sensor supply device 25 to transport the empty test tray 2 to a station D along a transport path B3. A fourth robot arm (not shown) places one series of the three-axial acceleration sensors 3 before the inspection in the receptacle portions of the test tray 2. In the fourth step, the control unit 28 controls the sensor supply device 25 to transport the test tray 2 with the three-axial acceleration sensors 3 retained therein to a specific position of a lifter (not shown) along a transport path B4. In the fifth step, the control unit 28 controls the lifter to transport the test tray 2 with the three-axial acceleration sensors 3 retained therein at a supply position S along a transport path B5.

As described above, the inspection process according to the embodiment of the invention is performed. After the three-axial acceleration sensors 3 send the acceleration component signals, the acceleration component signals are stored in the storage unit of the control unit 28. Accordingly, it is determined whether the three-axial acceleration sensors 3 pass or fail, or the acceleration component signals in each axis are calibrated.

As described above, in the embodiment, the three-axial acceleration sensor inspection device 1 is provided with the supporting plates 10 arranged radially around the main rotational shaft 11 with an equal angular interval. Further, the test plates 7 are rotatably supported on the supporting plates 10, and the test trays 2 with one series of the three-axial acceleration sensors 3 retained therein are mounted on the test plates 7. Accordingly, it is possible to inspect the three-axial acceleration sensors 3 at the four angular positions in each axial position at the same time.

Further, in the embodiment, the takt time T constitutes a sum of the mounting time IN; the measurement time M; the demounting time OUT; and the angular position changing time R (T=IN+M+R+OUT).

On the other hand, in a conventional inspection device, one series of the three-axial acceleration sensors 3 is mounted each time the inspection process is performed at one angular position. Accordingly, the measurement time M and the angular position changing time R take four times longer than those in the embodiment (T=IN +4M+4R+OUT). As a result, in the embodiment of the present invention, it is possible to shorten the takt time T less than half of that in the conventional inspection device.

In the embodiment, the supporting plates 10 are arranged radially around the main rotational shaft 11. Accordingly, it is possible to inspect a large number of the three-axial acceleration sensors 3 without increasing the number of the three-axial acceleration sensors 3 in one series to be retained in the test tray 2 (at least double of the conventional device). Further, it is possible to arrange the supporting plates 10 on a small radius around the main rotational shaft 11, thereby reducing a size of the three-axial acceleration sensor inspection device 1. As a result, it is possible to reduce a size of the environmental chamber 23, thereby reducing energy consumption thereof for maintaining a constant temperature.

Figure 6:
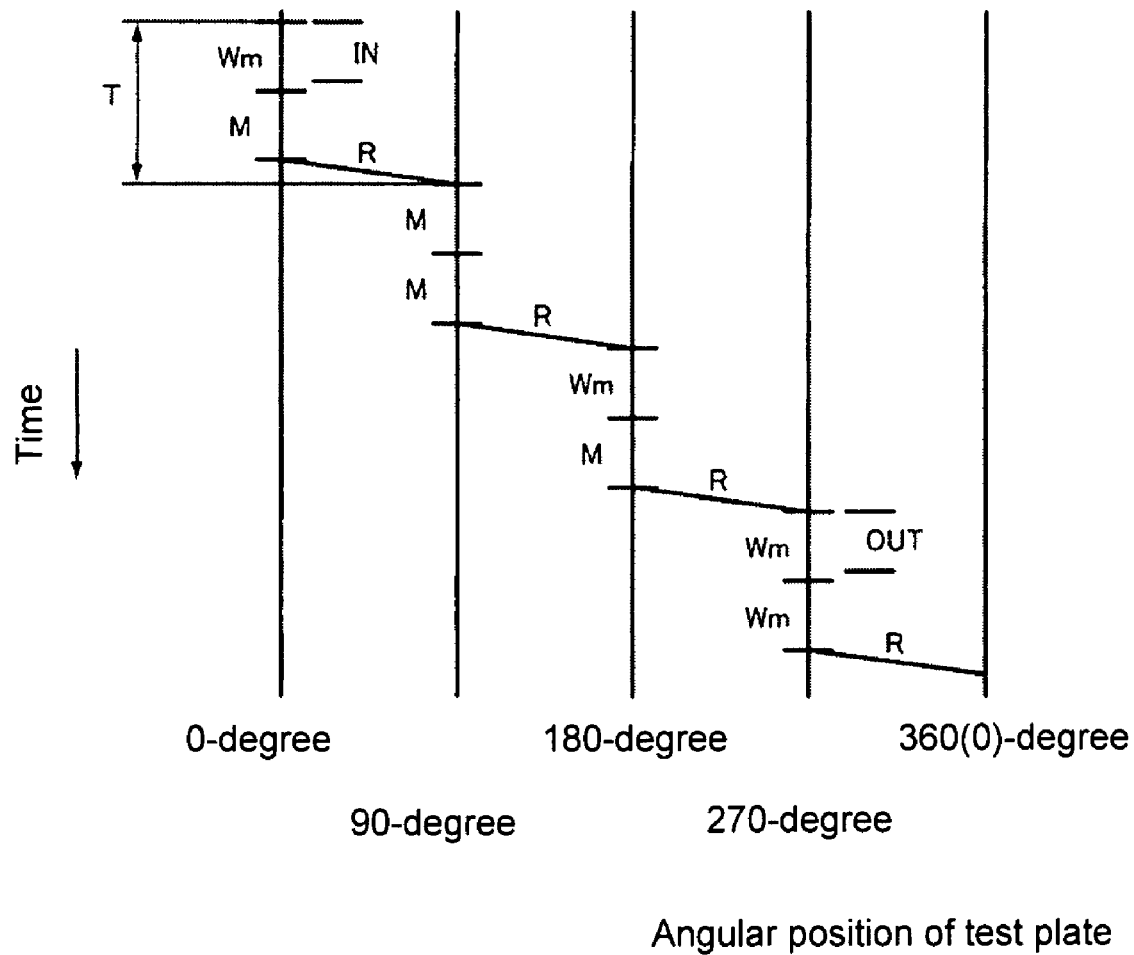
FIG. 6 is another time chart of the three-axial acceleration sensor inspection device according to the embodiment of the present invention.

When a sum of the mounting time IN and the demounting time OUT becomes equal to or larger than the measurement time M, the inspection process may be performed according to another time chart. FIG. 6 is another time chart of the three-axial acceleration sensor inspection device 1 according to the embodiment of the present invention.

In FIG. 6, a symbol "Wm" represents a waiting time with respect to the measurement time M of the first measurement at the 90-degree position. Other symbols are the same as those in the time chart shown in FIG. 5.

In the embodiment, the first measurement at the 90-degree position is performed similar to the inspection process at the 90-degree position described above except the following step. That is, instead of the step of rotating the test plate 7 with the test plate drive motor 15 by 90 degrees in the direction opposite to the arrow direction A to return to the original position, the test plate drive motor 15 rotates the test plate 7 further by 90 degrees in the arrow direction A to a position same as the original position at the 270-degree position. That is, the measurements at the 90-degree position and the 270-degree position in the process describe above are consecutively performed at the 90-degree position in the embodiment.

At the 90-degree position described above, the three-axial acceleration sensors 3 situated at the other angular positions are in an idle state (corresponding to the waiting time "Wm" in FIG. 6). At this time, similar to the demounting step described above, the second robot arm (not shown) transports the test tray 2 with the three-axial acceleration sensors 3 thus inspected to the sensor supply device 25 from the test plate 7 situated at the 270-degree position as the last position of the inspection process.

At this time, the test tray 2 is demounted from the test plate 7 situated at the 0-degree position as the first position of the inspection process. Accordingly, similar to the mounting step described above, the first robot arm (not shown) attaches the test tray 2 placed at the supply position S of the sensor supply device 25 and retaining one series of the three-axial acceleration sensors 3 to the test plate 7 situated at the 0-degree position.

As described above, in the embodiment, the measurements at the 90-degree position and the 270-degree position in the process describe above are consecutively performed at the 90-degree position. Accordingly, it is possible to demount the test tray 2 from the test plate 7 situated at the 270-degree position and attach the test tray 2 to the test plate 7 situated at the 0-degree position at the same time.

As a result, when a sum of the mounting time IN and the demounting time OUT becomes equal to or larger than the measurement time M, the mounting time IN and the demounting time OUT are absorbed in the first measurement time M at the 90-degree position. Accordingly, the takt time T becomes a sum of double of the measurement time M and the angular position changing time R (T=2M+R). As compare with the conventional inspection device (T=IN+4M+4R+OUT), it is possible to make the takt time less than half.

As described above, in the embodiments of the present invention, the three-axial acceleration sensor inspection device 1 is provided with the supporting plates 10 arranged radially around the main rotational shaft 11 with an equal angular interval. Further, the test plates 7 are rotatably supported on the supporting plates 10, and the test trays 2 with one series of the three-axial acceleration sensors 3 retained therein are mounted on the test plates 7. Accordingly, it is possible to inspect the three-axial acceleration sensors 3 at the four angular positions in each axial position at the same time.

In the embodiments, the takt time T constitutes a sum of the mounting time IN; the measurement time M; the demounting time OUT; and the angular position changing time R (T=IN+M+R+OUT). As a result, it is possible to shorten the takt time T, thereby improving inspection efficiency of the three-axial acceleration sensor inspection device 1. Further, it is possible to arrange the supporting plates 10 on a small radius around the main rotational shaft 11, thereby reducing a size of the three-axial acceleration sensor inspection device 1.

In the embodiments, the wireless transmitter 16 is provided for transmitting the acceleration component signals sent from the three-axial acceleration sensors 3. Accordingly, it is possible to easily obtain the acceleration component signals from the test plate 7 while rotating.

In the embodiments, the three-axial acceleration sensors 3 before the inspection process are mounted on the test plate 7 disposed on the main rotational shaft 11 at the first angular position, and the three-axial acceleration sensors 3 after the inspection process are demounted from the test plate 7 at the last angular position. Accordingly, it is possible to smoothly mount and demount the three-axial acceleration sensors 3 to and from the test plates 7, and to mount and demount the three-axial acceleration sensors 3 to and from the test plates 7 at the same time.

In the embodiments, the test trays 2 are provided for retaining the three-axial acceleration sensors 3, and the three-axial acceleration sensors 3 are mounted and demounted through the test trays 2. Accordingly, it is possible to smoothly mount and demount one series of the three-axial acceleration sensors 3. In the embodiments, the test plates 7 are provided with a plurality of sockets 8, and are not limited thereto. A probe card having a probe pin may be used as the test plate 7.

In the embodiments, the supporting plates 10 are arranged radially around the main rotational shaft 11 with the equal angular interval of 90 degrees. The number of the supporting plates 10 may be eight (equal angular interval of 45 degrees) or twelve (equal angular interval of 30 degrees), as far as the supporting plates 10 are arranged radially with the equal angular interval of 90 degrees.

When the number of the supporting plates 10 is increased, it is possible to inspect the three-axial acceleration sensors 3 in more detail and reduce the angular position changing time and the takt time. In this case, the last angular position becomes one position before the first angular position, i.e., a 315-degree position in the case of the eight supporting plates, and a 330-degree position in the case of the twelve supporting plates.

Further, according to the present invention, there is provided a method of inspecting a three-axial acceleration sensor. The method includes the steps of: placing the three-axial acceleration sensor on a test plate situated one of at least four locations around a main rotational shaft with an equal angular interval along a circumferential direction of the main rotational shaft; moving the test plate in a specific direction; and removing the three-axial acceleration sensor from the test plate situated at another of the four locations.

In the method of inspecting the three-axial acceleration sensor, the method may further include the steps of placing the three-axial acceleration sensor on a test tray; and attaching the test tray to the test plate.

The disclosure of Japanese Patent Application No. 2006-155074, filed on Jun. 02, 2006, is incorporated in the application by reference.

While the invention has been explained with reference to the specific embodiments of the invention, the explanation is illustrative and the invention is limited only by the appended claims.

What is claimed is:

1. A three-axial acceleration sensor inspection device for inspecting a three-axial acceleration sensor, comprising:
   a test plate for mounting the three-axial acceleration sensor thereon;
   a test tray for retaining the three-axial acceleration sensor, said test tray being attached to the test plate;
   a sensor supply device for mounting and demounting the test tray on and from the test plate;
   a supporting plate for supporting and rotating the test plate; and
   a main rotational shaft for rotating the supporting plate,
   wherein said supporting plate is arranged radially along a radius direction of the main rotational shaft and disposed at each of at least four locations with an equal angular interval along a circumferential direction of the main rotational shaft, and said sensor supply device is arranged to mount the test tray on the test plate situated at one of the four locations as a first measurement position, and to demount the test tray from the test plate situated at another of the four locations as a final measurement position.

2. The three-axial acceleration sensor inspection device according to claim 1, further comprising a transmitter mounted on the supporting plate for transmitting an acceleration component signal output from the three-axial acceleration sensor.

3. A method of inspecting a three-axial acceleration sensor, comprising the steps of:
   placing the three-axial acceleration sensor on a test tray;
   mounting the test tray on a test plate situated one of at least four locations around a main rotational shaft with an equal angular interval along a circumferential direction of the main rotational shaft;
   moving the test plate in a specific direction; and
   removing the test tray from the test plate situated at another of the four locations.

* * * * *